Dec. 28, 1965    C. E. ANDERSON    3,226,078
GATE VALVE

Filed Sept. 27, 1963    3 Sheets-Sheet 1

INVENTOR.
CLIFFORD E. ANDERSON
BY
AGENT

Dec. 28, 1965   C. E. ANDERSON   3,226,078
GATE VALVE
Filed Sept. 27, 1963   3 Sheets-Sheet 2

United States Patent Office 3,226,078
Patented Dec. 28, 1965

3,226,078
GATE VALVE
Clifford E. Anderson, Houston, Tex., assignor to ACF
Industries, Incorporated, New York, N.Y., a corporation of New Jersey
Filed Sept. 27, 1963, Ser. No. 312,188
14 Claims. (Cl. 251—62)

This invention relates to a gate valve and more particularly to a gate valve in which the gate member is moved back and forth by fluid control means for opening and closing a fluid passage extending through the valve.

Fluid operated gate valves have a valve body in which a gate is actuated by a valve stem extending from the gate and connected to a piston mounted for reciprocation within a cylinder. The valve body normally terminates in a head or bonnet adjacent a gate chamber and the cylinder is mounted on the head. In many instances, the cylinder is of a relatively large diameter, such as may be necessary when the gates are relatively heavy or of a relatively large size, and this diameter is often greater than the diameter of the head on the valve body to which the cylinder is bolted. Thus, a connection or fitting is required between the cylinder and the valve body. Prior adapters or fittings employed between the valve body and the cylinder have been expensive and required considerable space for mounting between the valve and the cylinder.

It is an object of this invention to provide an adapter plate for a piston operated gate valve in which bolt circles are arranged on the cylinder and the valve body, the bolt circle on the cylinder being of a substantially greater diameter than the diameter of the bolt circle on the valve body.

It is an additional object of this invention to provide a connection between the valve body and the cylinder which maintains a fluid-tight relation therebetween and prevents any leakage of fluid from the cylinder to the main fluid passage in the valve body.

An additional object is the provision of such an adapter plate which is adapted to be machined from a cylindrical blank to accommodate any desired diameter of bolt circles in the cylinder and the valve body and to enclose an end of the cylinder.

An additional object of the present invention is to provide a piston operated gate valve having a connection between the cylinder and the valve body which may be positioned in a minimum of space and is relatively inexpensive.

Briefly described, my invention comprises a generally circular adapter plate for a piston operated gate valve positioned between the circular end of a cylinder and the circular head or bonnet on a valve body to which the cylinder is mounted, the adapter plate forming an end of the cylinder and connecting the cylinder to the valve body. Since the circular head is of a relatively small diameter, openings through the adapter plate in which bolts are received to secure the adapter plate on the head communicate with the interior of the cylinder, with at least a portion of the openings within an area defined by an axial extension of the inner periphery of the cylinder. To provide a fluid-tight connection between the cylinder and valve body, a substantially rigid sealing ring is positioned within the cylinder over the openings in the adapter plate, the sealing ring having an outer diameter substantially equal to the inner diameter of the cylinder to maintain a fluid-tight relation with the interior of the cylinder and to prevent leakage of fluid from the cylinder to the fluid passage in the valve body through the openings in the adapter plate. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated;

Corresponding reference characters indicate corresponding parts throughout the several views of the drawings.

Figure 1:
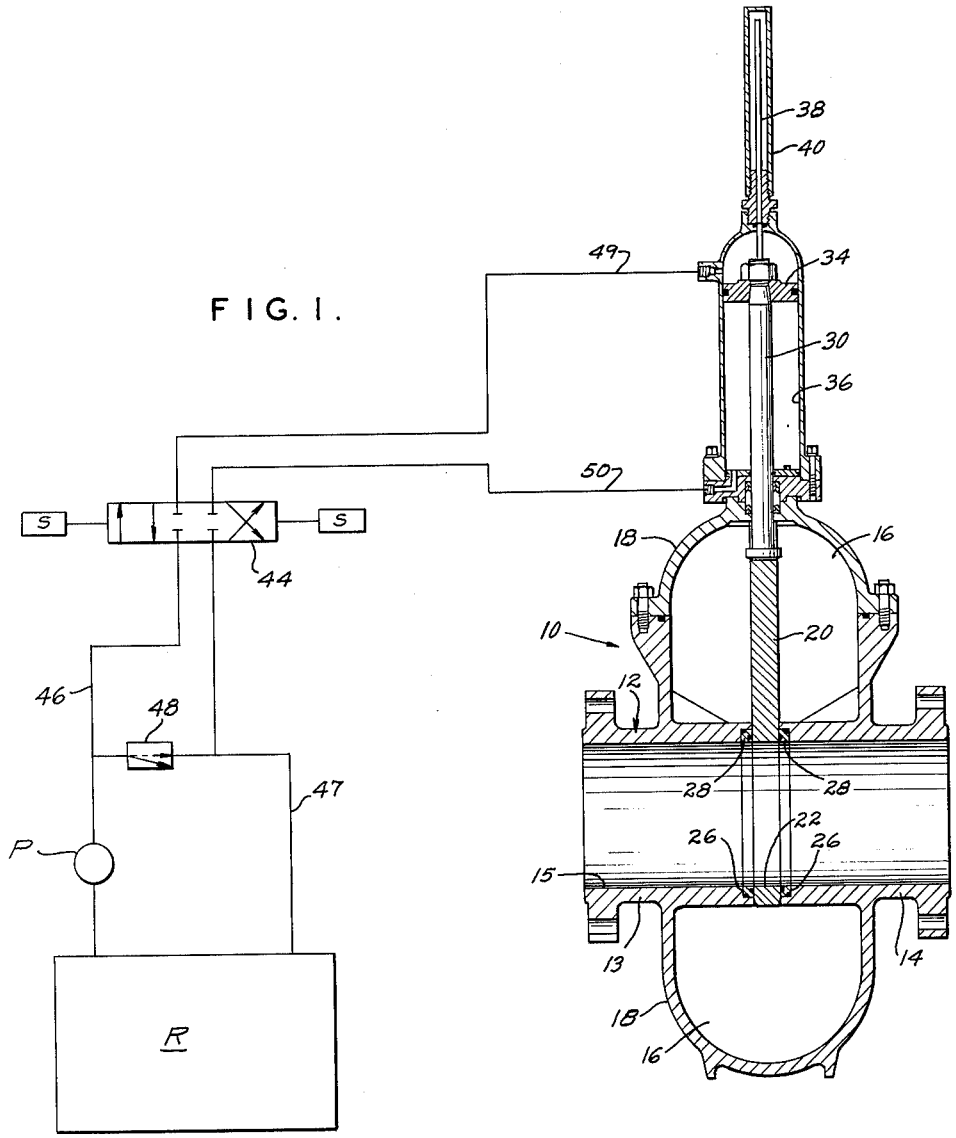
FIGURE 1 is a sectional view of a gate valve of one embodiment of the present invention, the fluid control system for the valve being shown schematically.

Referring now to the drawings and more particularly to the embodiment of the invention shown in FIGURES 1–4, a gate valve is indicated generally at 10. Gate valve 10 has a valve body 12 comprising an inlet portion 13 and an outlet portion 14. A bore 15 through portions 13 and 14 forms a longitudinally extending fluid passage therethrough.

Intersecting fluid passage 15 is a gate chamber 16 formed by housing 18. Mounted in chamber 16 is a reciprocating slab gate member 20 comprising a substantially flat metal plate having a passage 22 adapted to register with passage 15 when valve 10 is opened to form a smooth passageway for uninterrupted fluid flow. When valve 10 is closed, gate 20 extends across passage 15 and blocks fluid flow through the passage. Housing 18 terminates upwardly in a circular head 24 having a bolt circle along which openings 25 are arranged.

Inlet portion 13 and outlet portion 14 have recesses 26 adjacent gate member 20 in which seat members 28 fit as is well known in the art. Gate member 20 engages seat members 28 as it slides back and forth upon opening and closing of fluid passage 15.

For raising and lowering gate 20, a stem 30 extends through a sealed passage in head 24 and fits within a slot 32 of gate 20. Secured adjacent the upper end of stem 30 opposite gate 20 is a piston 34 mounted for reciprocation within cylinder 36. An indicator rod 38 extends upwardly from stem 30 and a removable housing 40 forms a protective cover for rod 38. The position of gate 20 is indicated by rod 38 upon removal of housing 40 and visual inspection of rod 38.

A reservoir R supplies fluid to a pump P through fluid line 42. Fluid from pump P is supplied to a four-way valve 44 through supply line 46. Line 47 returns fluid to reservoir R from valve 44. A relief valve 48 is actuated at a predetermined fluid pressure to return fluid to reservoir R through return line 47 when an excessive fluid pressure is reached in line 46. Solenoids S control the movement of valve 44. It is to be understood that valve 44 may be manually or pilot controlled, if desired. Lines 49 and 50 extend to cylinder 36 from valve 44 and control the flow of fluid to cylinder 36. Upon movement of valve 44 to the right viewing FIGURE 1, fluid is supplied to cylinder 36 through line 49 to close gate 20. Upon movement of valve 44 to the left viewing FIGURE 1, fluid is supplied to cylinder 36 through line 50 to open gate 20.

Figure 2:
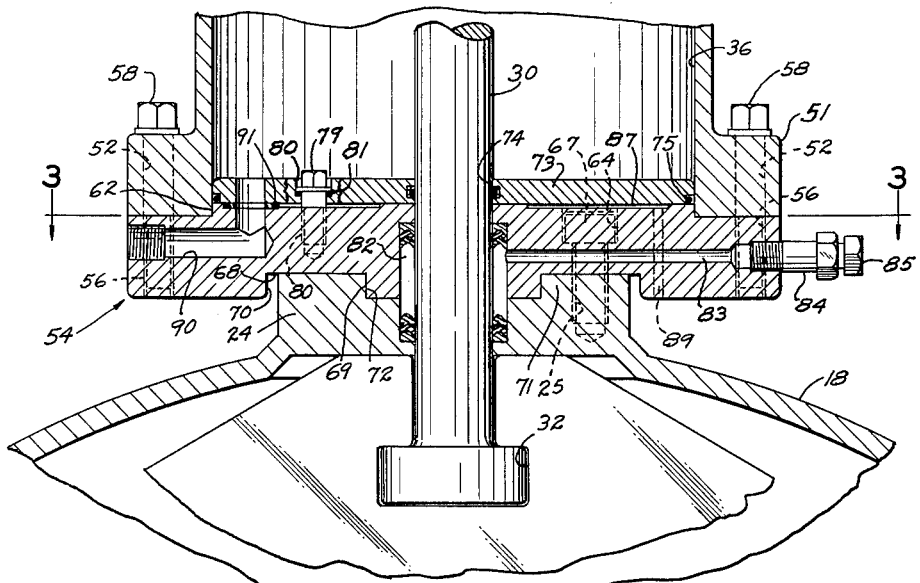
FIGURE 2 is an enlarged fragment of FIGURE 1.

Referring particularly to FIGURE 2, cylinder 36 has a lower outwardly extending flange 51 forming an annular rim. Bolt holes or openings 52 are spaced along a bolt circle about flange 51.

A circular adapter plate designated generally 54 and forming an important feature of this invention is positioned between cylinder 36 and head 24. Plate 54 may be easily machined from a cylindrical stock and is of an outer diameter substantially equal to the outer diameter of flange 51. Arranged in a bolt circle 55 along the marginal portion of plate 54 are spaced openings 56 aligned with openings 52 in flange 51. Suitable bolts 58 are received within openings 52 and 56 to secure cylinder 36 to adapter plate 54. A boss or raised portion 60 extends interiorly of cylinder 36 and forms a circumferential shoulder 62 engaging the inner surface of the cylinder wall to align adapter 54 with respect to cylinder 36. Plate 54 is fitted within and closes the lower end of cylinder 36.

Additional spaced openings 64 extend through adapter plate 54 and are arranged along bolt circle 65 concentric to bolt circle 55. Bolts 67 are received by aligned openings 25 and 64 to secure adapter plate 54 to head 24. The lower face of adapter plate 54 has a circumferential groove 68 forming an inner shoulder 69 and an outer shoulder 70. A raised or stepped portion 71 of head 24 has an inner shoulder 72 which fits against shoulder 69 on adapter plate 54 when stepped portion 71 is received within groove 68. Bolts 67 secure adapter plate 54 to head 24. Interfitting shoulders 69 and 72 align adapter plate 54 relative to housing 18, and in cooperation with shoulder 62 hold cylinder 36 in alignment with stem 30 and housing 18.

As head 24 is of a diameter substantially smaller than the diameter of cylinder 36, openings 64 are within an area defined by an axial extension of the inner periphery of the cylinder wall and thus must be sealed from the interior of cylinder 36 to prevent any leakage of fluid from the interior of the cylinder. A rigid sealing ring plate 73 is placed over openings 64 to close openings 64 to the interior of cylinder 36 and has a central opening 74 receiving stem 30. The outer diameter of ring 73 is substantially equal to the inner diameter of cylinder 36. An O-ring 75 forms a fluid-tight seal between the outer periphery of ring 73 and the inner surface of cylinder 36.

Figure 4:
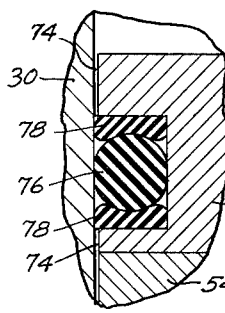
FIGURE 4 is a sectional view of the sealing means about the valve stem.
Figure 3:
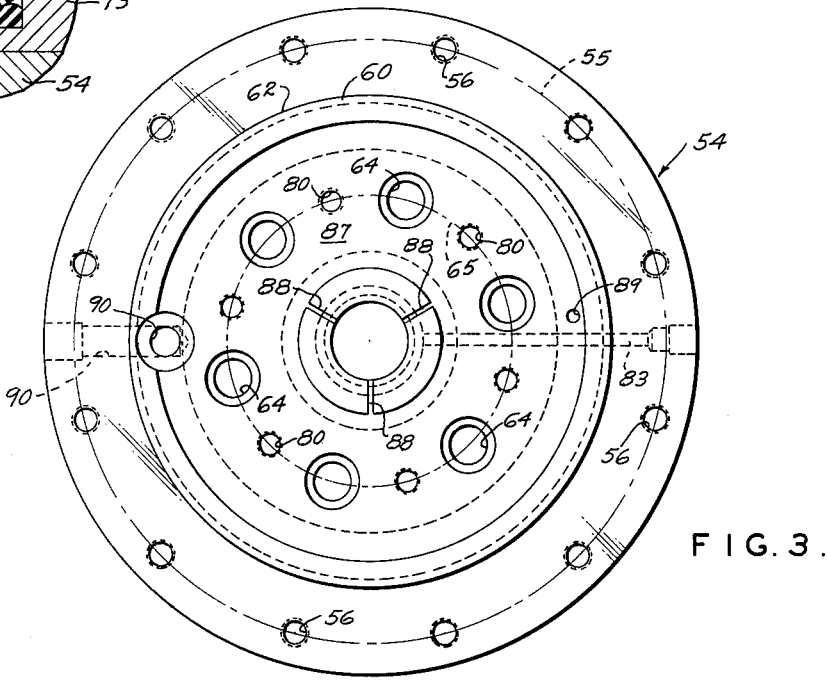
FIGURE 3 is a plan view looking generally along line 3—3 of FIGURE 2 and showing the adapter plate of the present invention.

Referring to FIGURE 4, an O-ring 76 forms a seal between stem 30 and ring 73. An extrusion ring 78 forms a seat on each side for O-ring 76. Extrusion rings 78 and O-ring 76 may be formed of a suitable elastomeric material, such as hard rubber or Teflon, a tetrafluoroethylene resin supplied by E. I. duPont de Nemours and Company, Inc. Bolts 79 extend through aligned openings 80 in ring 73 and adapter plate 54 along bolt circle 65. Washers 81 in openings 80 form a fluid-tight seal about bolts 79.

A packing 82 surrounds and seals stem 30 while permitting sliding movement relative to head 24 and adapter plate 54. A plastic packing injection passage 83 extends from the outer periphery of adapter plate 54 to packing 82 and a plastic packing injection fitting 84 is threaded within the inlet to passage 83. A threaded screw 85 is received within fitting 84 and upon rotation thereof in one direction a suitable plastic lubricant is forced through passage 83 to packing 82. It is to be understood that other types of packing may be employed, if desired.

In order to prevent fluid within gate chamber 16 from leaking past packing 82 and into cylinder 36 and thereby possibly contaminating hydraulic fluid within cylinder 36 or building up pressure under piston 34, a drain passageway is provided. A circumferential groove 87 is formed in the upper face of adapter plate 54. Drain notches 88 extend from stem 30 to groove 87 and a drain passage 89 extends from groove 87 to the lower face of adapter plate 54. Thus, fluid which leaks past packing 82 may be drained by notches 88, groove 87 and drain passage 89 thereby to prevent fluid from leaking into cylinder 36 from gate chamber 16 or packing 82. Also, fluid from cylinder 36 is prevented from leaking past packing 82. Hydraulic fluid is supplied to cylinder 36 for raising gate 20 through passage 90 in ring 70 and adapter plate 54. A suitable O-ring 91 prevents leakage of fluid into groove 87. Fluid is returned to reservoir R through passage 90 upon lowering of gate 20.

Adapter plate 54 closes the end of cylinder 36 in addition to connecting a relatively large diameter cylinder to a relatively small diameter head 24 on the valve housing. Adapter plate 54 is formed from a cylindrical stock and may be machined to fit various diameters of cylinders and adjacent heads while requiring only a minimum of space between the cylinder and the adjacent valve housing.

It is to be understood that various types of sealing means may be provided to seal openings in the adapter plate from the interior of the cylinder. FIGURES 5, 6, 7 and 8 indicate several alternate arrangements which may be employed effectively.

Figure 5:
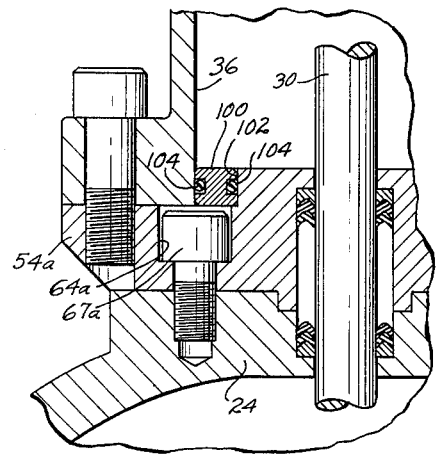
FIGURE 5 is an enlarged sectional view of another embodiment of the present invention in which a sealing ring is positioned in an annular groove between the cylinder and the adapter plate.

FIGURE 5 shows a seal ring 100 over openings 64a and bolts 67a of adapter plate 54a. Seal ring 100 is positioned between shoulder 102 on adapter plate 54a and the inner surface of cylinder 36. O-rings 104 are positioned on opposite sides of seal ring 100.

Figure 6:
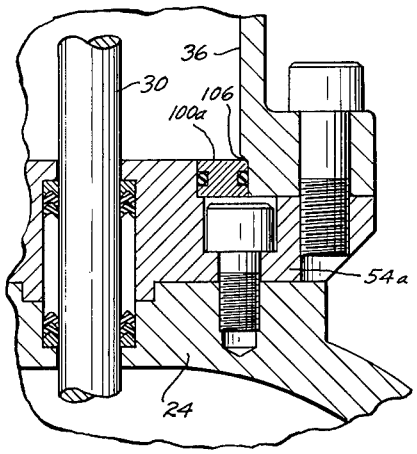
FIGURE 6 is an enlarged sectional view of a further embodiment of the present invention in which a sealing ring is retained against an abutment within an annular groove between the cylinder and the adapter plate.

FIGURE 6 indicates a seal ring 100a similar to seal ring 100 in FIGURE 5 but being restrained or retained in position by an abutment 106 on the wall of cylinder 36 and facing in a direction toward adapter plate 54a. Seal ring 100a in FIGURE 6 is thus held in its longitudinal position between adapter plate 54a and cylinder 36 by abutment 106.

Figure 7:
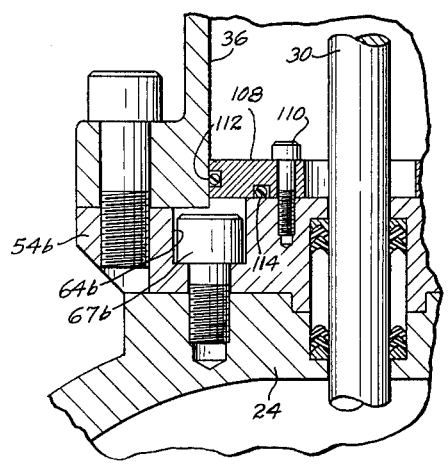
FIGURE 7 is an enlarged sectional view of a further embodiment of the present invention in which a sealing ring is bolted to the adapter plate.

FIGURE 7 shows a seal ring 108 positioned over openings 64b and bolts 67b in adapter plate 54b. Bolts 110 secure ring 108 to adapter plate 54b over openings 64b. An O-ring 112 is positioned between the outer circumference of ring 108 and the inner face of cylinder 36. An O-ring 114 is positioned between he lower face of seal ring 108 and the upper face of adapter plate 54b.

Figure 8:
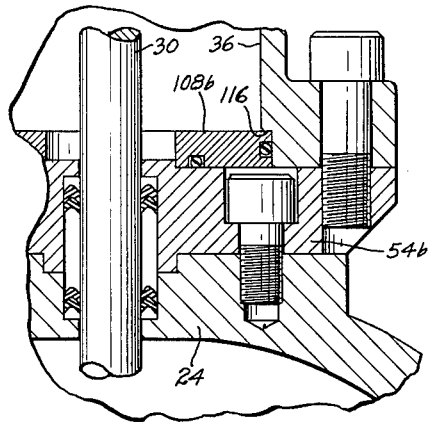
FIGURE 8 is an enlarged sectional view of an additional embodiment of the present invention showing a sealing ring retained in position against the adapter ring by an abutment within the cylinder.

FIGURE 8 shows a further embodiment in seal ring 108b similar to seal ring 108 of FIGURE 7 but being radially retained in position by abutment 116 on the inner wall of cylinder 36. Abutment or shoulder 116 faces in the direction of adapter plate 54b. Additional securing means are not required for the seal ring in the embodiment shown in FIGURE 8.

In view of the above, it will be seen that the several objects of the invention are achieved and other advantageous results obtained.

As various changes could be made in the above constructions without departing from the scope of the invention, it is intended that all matter contained in the above description and shown in the accompanying drawings shell be interpreted as illustrative and not in a limiting sense.

What is claimed is:

1. In a gate valve, a housing having a bore forming a flow passage therethrough, a valve chamber interrupting the bore, a gate located in said valve chamber, said gate having a passage alignable with the bore in an open position and a solid portion to cover said bore in a closed position, said housing terminating outwardly in a head having a central opening and a plurality of spaced openings arranged in a circle on the head about said central opening, a stem in the chamber for operating the gate and connected at one end to said gate, the opposite end of said stem extending from the gate chamber through said central opening in the head, a cylinder surrounding the extending end of the stem and having an outwardly extending flange forming a rim about its end adjacent said head, a piston connected to the stem and adapted to move the stem back and forth when actuated thereby to open and close the gate, an adapter plate positioned between said head and said cylinder and closing the adjacent end of the cylinder, said adapter plate having a central opening receiving said stem and a plurality of spaced openings extending completely through said plate and arranged in a circle around said central opening and aligned with the spaced openings in said head, said adapter plate being generally circular in shape and of an outer diameter substantially equal to the outer diameter of said rim on said cylinder, means securing said rim to said adapter plate, means extending through said aligned openings in said adapter plate and said head to secure the adapter plate to the head, the diameter of the circle on which said aligned openings are arranged being substantially equal to or smaller than the inner diameter of said cylinder whereby at least a portion of the openings are within an area defined by an axial extension of the inner periphery of the cylinder, and sealing means positioned in the cylinder and being fixed to the adapter plate, said sealing means establishing a fluid tight seal with said stem and said adapter plate and covering the openings in the adapter plate whereby said openings are sealed from fluid within the said cylinder.

2. In a gate valve as defined in claim 1, said sealing means comprising a substantially rigid sealing ring positioned within said cylinder over said aligned openings, said sealing ring having an outer diameter substantially equal to the inner diameter of the cylinder, and means between the outer circumference of said ring and the inner surface of the wall of said cylinder to maintain a substantially fluid-tight relation therebetween.

3. In a gate valve as defined in claim 2, the wall of said cylinder having an enlarged inner diameter adjacent said adapter plate forming an abutment facing said gate, said adapter having a raised portion on the face thereof adjacent the cylinder fitting within the interior of the cylinder and spaced from the wall of the cylinder to form a groove therebetween, said ring being postioned in said groove against said abutment and retained in position by said abutment.

4. In a gate valve as defined in claim 1, said sealing means comprising a substantially rigid sealing ring positioned within the cylinder over said aligned openings, said sealing ring having an outer diameter substantially equal to the inner diameter of said cylinder and an inner diameter substantially equal to the diameter of said stem, an O-ring between the inner circumference of said ring and said stem to maintain a substantially fluid-tight relation therebetween, an O-ring between the outer circumference of said ring and the wall of said cylinder to maintain a substantially fluid-tight relation therebetween, and means securing the substantially rigid sealing ring to said adapter plate.

5. In a gate valve as defined in claim 4, a fluid passageway extending from one face of the adapter plate adjacent the stem to a position spaced outwardly from said head whereby an fluid leaking past said sealing means between the ring and said stem may be drained outwardly of said head.

6. In a gate valve as defined in claim 4, a fluid passageway extending through said sealing ring in said adapter plate and communicating with the interior of said cylinder, and means supplying fluid to said cylinder through said fluid passageway.

7. In a gate valve, a body having a fluid passage extending therethrough, a gate movable back and forth to close and open said passage, a housing forming a gate chamber and enclosing said gate when said passage is open, said housing terminating outwardly in a generally circular head having a central opening and a plurality of spaced openings arranged in a circle about said central opening, a stem for operating the gate and connected at one end to the gate, the opposite end of said stem extending from the gate chamber through said central opening in the head, a cylinder surrounding the extending end of the stem and having an outwardly extending flange forming a generally circular rim about its end adjacent said head, a piston connected to the stem and adapted to move the stem back and forth when actuated thereby to open and close the gate, an adapter plate positioned betwen said head and said cylinder and closing the adjacent end of the cylinder, said adapter plate having a central opening receiving said stem and a plurality of spaced openings extending completely through said plate and arranged in a circle about said central opening, the spaced openings in said adapter plate being axially aligned with the spaced openings in said head, said adapter plate being generally disclike in shape and of an outer diameter substantially equal to the outer diameter of said rim on said cylinder, the diameter of said generally circular head on said housing being substantially smaller than the diameter of said rim and said adapter plate, a substantially rigid sealing ring fixed to the adapter plate within said cylinder and forming a cover for said aligned openings, said sealing ring having an outer diameter substantially equal to the inner diameter of the cylinder, sealing means between the outer periphery of said ring and the wall of said cylinder to maintain a substantially fluid-tight relation therebetween outwardly of the aligned openings, additional sealing means on the ring at a position between the aligned openings and the interior of the cylinder to maintain a substantially fluid-tight relation inwardly of the aligned openings, and means to secure the sealing ring to the adapter plate.

8. In a gate valve as defined in claim 7, said sealing ring having an inner diameter substantially equal to the diameter of said stem, and said additional sealing means comprises an O-ring positioned between the inner circumference of the ring and said stem to maintain a substantially fluid-tight relation therebetween.

9. In a gate valve having a body with a fluid passage extending therethrough, said body having a gate chamber terminating in a generally circular head having a plurality of spaced openings arranged in a circle, a gate movable back and forth in the gate chamber to close and open said passage, and a piston operator mounted on said head and operatively connected to the gate for moving the gate back and forth, said piston operator including a cylinder having an outwardly extending flange on one end thereof forming a rim with an outer diameter substantially greater than the diameter of said head, the improvement comprising: an adapter plate mounted on said head between the head and said cylinder and forming an end for the cylinder, said adapter plate being generally disclike in shape with a diameter substantially equal to the outside diameter of said rim and having a plurality of spaced openings extending completely through said plate and arranged in a circle in axial alignment with the spaced openings on said head, said aligned spaced openings having at least a portion thereof within an area defined by an axial extension of the inner periphery of the cylinder, a substantially rigid sealing ring positioned within said cylinder adjacent said adapter plate and forming a cover for said aligned openings, said sealing ring having an outer diameter substantially equal to the inner diameter of the cylinder, means between the outer periphery of the sealing ring and the inner periphery of the cylinder to provide a substantially fluid-tight relation therebetween, and means securing the ring to said adapter plate.

10. In a gate valve as defined in claim 9, said sealing ring having an inner diameter substantially equal to the outer diameter of said piston operator passing through aligned central openings in said adapter plate and said head, and sealing means between the inner periphery of the sealing ring and the operator to maintain a substantially fluid-tight relation therebetween.

11. An adapter plate for connecting a piston operator to the adjacent head of a gate valve wherein the diameter of the cylinder for the piston operator is substantially larger than the adjacent head of the gate valve on which the plate is supported, said adapter plate being generally disc-like in shape with a diameter substantially equal to the outside diameter of said cylinder and having a plurality of spaced openings extending completely through said plate and arranged in a circle, said spaced openings having at least a portion thereof within an area defined by an axial extension of the inner periphery of the cylinder, a substantially rigid sealing ring positioned within the cylinder over the spaced openings, said sealing ring having an outer diameter substantially equal to the inner diameter of the cylinder, and means between the outer periphery of the sealing ring and the inner periphery of the cylinder to provide a substantially fluid-tight relation therebetween.

12. An adapter plate as set forth in claim 11 wherein said sealing ring and said adapter plate have aligned central openings receiving the piston operator, and sealing means are positioned between the inner periphery of the sealing ring and the operator to maintain a substantially fluid-tight relation therebetween.

13. In a gate valve having a body with a fluid passage extending therethrough, said body having a gate chamber terminating in a generally circular head having a plurality of spaced openings arranged in a circle, a gate movable back and forth in the gate chamber to close and open said passage, and a piston operator mounted on said head and operatively connected to the gate for moving the gate back and forth, said piston operator including a cylinder having an outwardly extending flange on one end thereof forming a rim with an outer diameter substantially greater than the diameter of said head, the improvement comprising: an adapter plate mounted on said head between the head and said cylinder and forming an end for the cylinder, said adapter plate being generally disclike in shape with a diameter substantially equal to the outside diameter of said rim and having a plurality of spaced openings extending completely through said plate and arranged in a circle in axial alignment with the spaced openings on said head, said aligned spaced openings having at least a portion thereof within an area defined by an axial extension of the inner periphery of the cylinder, a circumferential raised portion on one face of the adapter plate fitting within the cylinder to position the cylinder relative to the adapter plate, and the opposite face of said adapter plate having a circumferential groove receiving said head in interfitting relation whereby said adapter plate is aligned accurately relative to said head, a generally circular sealing plate disposed within said cylinder and establishing a fluid tight seal therewith to prevent fluid within the cylinder from coming into contact with said spaced openings.

14. In a gate valve having a body with a fluid passage extending therethrough, said body having a gate chamber terminating in a generally circular head having a plurality of spaced openings arranged in a circle, a gate movable back and forth in the gate chamber to close and open said passage, and a piston operator mounted on said head and operatively connected to the gate for moving the gate back and forth, said piston operator including a cylinder having an outwardly extending flange on one end thereof forming a rim with an outer diameter substantially greater than the diameter of said head, the improvement comprising: an adapter plate mounted on said head between the head and said cylinder and forming an end for the cylinder, said adapter plate being generally disclike in shape with a diameter substantially equal to the outside diameter of said rim and having a plurality of spaced openings extending completely through said plate and arranged in a circle in axial alignment with the spaced openings on said head, said aligned spaced openings having at least a portion thereof within an area defined by an axial extension of the inner periphery of the cylinder, a raised portion on the face of said adapter plate facing the cylinder and forming a circumferential shoulder extending within and fitted against the inner wall surface of the cylinder, the opposite face of said adapter plate having a circumferential groove forming inner and outer circumferential shoulders, and said head having a projection fitting within said circumferential groove against said inner circumferential shoulder thereof to align the adapter plate relative to said head, a generally circular sealing plate disposed within said cylinder and establishing a fluid tight seal therewith to prevent fluid within the cylinder from coming into contact with said spaced openings.

References Cited by the Examiner
UNITED STATES PATENTS

| | | | |
|---|---|---|---|
| 1,769,386 | 7/1930 | Orton | 251—62 X |
| 2,426,108 | 8/1947 | Loewe | 92—164 X |
| 2,738,945 | 3/1956 | Shafer | 251—31 X |
| 2,896,582 | 7/1959 | Justice | 251—31 X |

M. CARY NELSON, *Primary Examiner.*